March 15, 1960  C. L. JOHNSON  2,928,209

DUCK CALL

Filed Aug. 14, 1958

INVENTOR.
CHARLES L. JOHNSON
BY
*Pollard, Johnston, Smythe & Robertson*
ATTORNEYS.

United States Patent Office 2,928,209
Patented Mar. 15, 1960

2,928,209

DUCK CALL

Charles L. Johnson, Poplar Bluff, Mo., assignor to Robert Seymour Lynch, an individual Application August 14, 1958, Serial No. 754,974

3 Claims. (Cl. 46—180)

The invention relates to a hunting instrument for imitating the calls of wild fowl.

Instruments of this type are known as "calls," e.g. a duck call, goose call and the like. In general they may be described as a reed wind instrument which consists of a tubular body or barrel with a reed pipe removably mounted in it. The reed pipe goes into one end of the barrel like a stopper and the hunter blows into the other end. The reed pipe has an inward extension called a palate and the reed is mounted so as to bear against the palate. The adjustment of the reed mounting is quite sensitive and the slightest change in the adjustment can so distort the quality of the call as to frighten the birds rather than bring them in. Maladjustments can occur when the instrument is taken apart for cleaning and reassembled, or through distortion of the reed mounting by temperature changes or other atmospheric disturbances. The satisfactory retention of the correct reed adjustment has long been a matter of serious concern to bird hunters and to manufacturers of game bird calls. Sometimes the reed is held in the palate by a separate pressure block and a ring. This is fussy for the hunter to handle when he takes the call apart for cleaning, and when he puts it back together the proper adjustment can easily be lost. Other schemes have involved holding the reed by means of pressure blocks formed integrally with either the pipe or the barrel, but such alternatives have not been quite satisfactory either. When the pressure block is made as a part of the barrel, the adjustment can be disturbed by taking the call apart, because too much depends on how it is put back together and whether exact alignment of the parts is secured under just the right pressure upon pushing the pipe into the barrel. And when the pressure block is made as a part of either the pipe or the barrel, heat or other atmospheric conditions can cause it to warp out of line and completely alter the imitative capabilities of the instrument.

It is an object of my invention to find a more adequate solution of the problem how to hold the reed to the palate in a manner which will preserve its sensitive adjustment under all normal conditions of use by the hunter.

According to my invention, the reed is held against the palate solely by interlocking means between the reed and palate, the reed being free of contact with any other part of the assembly. The interlocking means comprises projections on the reed engaged under shoulders on the palate. By virtue of this construction, pressure blocks associated with the palate, barrel or other parts of the instrument can be eliminated and critical adjustment of the reed pressure more accurately maintained in service. Moreover, assembly and disassembly of the instrument is made easier because of the self-retaining feature of the reed.

Referring to the drawing, I shall now describe the best mode contemplated by me for carrying out my invention.

Figure 1:
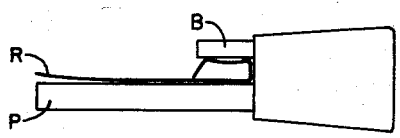
Figs. 1 and 2 are comparative diagrams to explain the problem of change in adjustment as produced by pressure block misalignment or warping.
Figure 2:
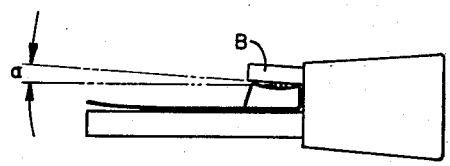

Figs. 1 and 2 show what can happen with one of the pressure block arrangements of the prior art in which warping of the block B or its mounting causes it to move from its proper relation to the palate, Fig. 1, to a position of misalignment, Fig 2. The angle of misalignment is represented at $a$. Pressure of reed R against palate P is decreased. Such a distortion can change the call from one which will bring in ducks to one which will scare them. This is what my invention seeks to avoid.

Figure 4:
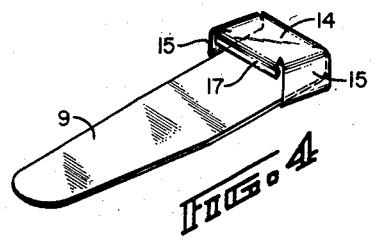
Fig. 4 is a perspective view of the metal reed of my invention.
Figure 3:
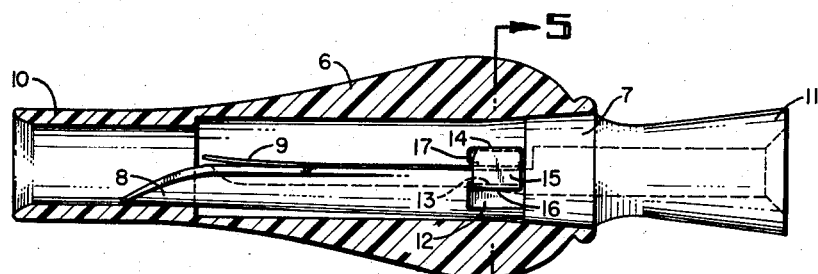
Fig. 3 is a longitudinal cross sectional view, partly in elevation, of a duck call constructed according to my invention.
Figure 5:
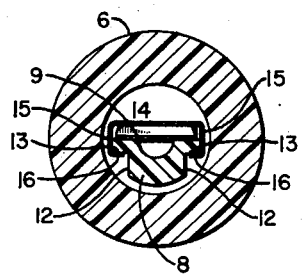
Fig. 5 is a cross section taken as shown at 5—5 in Fig. 3.

In my preferred construction as shown in Figs. 3 to 5, inclusive, the instrument comprises a tubular body or barrel 6 and a reed pipe 7 removably mounted therein, the reed pipe including a palate 8 and a reed 9 held against the palate solely by interlocking means between the reed and palate, the reed being free of contact with all other parts of the assembly. One end 10 of the barrel forms a mouthpiece and the reed pipe 7 fits into the other end like a stopper. The outer end 11 of the reed pipe forms the horn of the instrument. The palate 8 has notched sides 12 forming shoulders 13. The metal reed 9 has a reverse bend 14 at its base and hooked arms 15 extending from said reverse bend past the plane of te reed to provide a pair of snap hooks for attaching the reed directly to the palate under a predetermined pressure bias. Projections 16 of the hooks are engaged under shoulders 13 of the palate to furnish the interlocking engagement which holds the reed in the desired critical relationship to the palate. A flange 17 at the end of reverse bend 14 may be provided for further control of reed pressure. The reed pipe and barrel are preferably made of plastic material, but other materials may be used if desired.

The terms and expressions which I have employed are used in a descriptive and not a limiting sense, and I have no intention of excluding such equivalents of the invention described as fall within the scope of the claims.

I claim:

1. A game bird call comprising a tubular body and a reed pipe removably mounted therein, the reed pipe including a palate and a reed, the base end of the reed having a reverse bend overlying and spaced from the portion of the reed adjacent said base end, and attaching means extending from the reverse bend past the plane of the reed and engaging the palate, whereby the reed is held in predetermined relationship to the palate with the reverse bend being free of all other parts of the assembly.

2. A game bird call comprising a tubular body and a reed pipe removably mounted therein, the reed pipe including a palate and a reed, the base end of the reed having a reverse bend resiliently attached thereto, said reverse bend overlying and spaced from the portion of the reed adjacent said base end, and attaching means resiliently connected to and extending from the reverse bend past the plane of the reed and engaging the palate, whereby the free end portion of the reverse bend opposite its resilient attachment is urged into contact with the reed and the reed is held in predetermined relationship to the palate under a predetermined pressure bias.

3. A game bird call comprising a tubular body and a reed pipe removably mounted therein, the reed pipe including a palate having notched sides and a reed, the base end of the reed having a reverse bend resiliently attached thereto, said reverse bend overlying and spaced from the portion of the reed adjacent said base end, a flange member extending from the free end of the reverse bend opposite its resilient attachment and in the direction of the reed, and hooked arms resiliently connected to and extending from the reverse bend past the plane of the reed and engaging the notched sides of the palate, whereby the flange member is urged into contact with the reed and the reed is held in predetermined relationship to the palate under a predetermined pressure bias.

References Cited in the file of this patent

UNITED STATES PATENTS

| | | | |
|---|---|---|---|
| 2,317,458 | Herter | Apr. 27, | 1943 |
| 2,518,616 | Herter | Aug. 15, | 1950 |
| 2,555,813 | Priess | June 5, | 1951 |
| 2,714,275 | Proll | Aug. 2, | 1955 |
| 2,833,085 | Wintriss | May 6, | 1958 |